United States Patent [19]
Dzung et al.

[11] Patent Number: 5,265,264
[45] Date of Patent: Nov. 23, 1993

[54] CONVERTIBLE HALF-TO-FULL DUPLEX RADIO OPERATION SELECTED BY BATTERY

[75] Inventors: John C. Dzung, Plantation; Scott H. Richards, Sunrise, both of Fla.

[73] Assignee: Motorola, Inc., Schaumburg, Ill.

[21] Appl. No.: 811,859

[22] Filed: Dec. 23, 1991

[51] Int. Cl.⁵ .......................... H04B 1/38; H04B 1/08
[52] U.S. Cl. ...................................... 455/90; 455/349; 455/350; 455/234.1; 379/390; 379/58
[58] Field of Search ............... 455/89, 90, 234.1, 348, 455/349, 350, 351, 127; 379/58, 388, 389, 390-391, 392, 420, 432; 370/24, 26

[56] References Cited
U.S. PATENT DOCUMENTS

| | | |
|---|---|---|
| D. 135,540 | 4/1943 | Mitchell . |
| D. 300,752 | 4/1989 | Soren et al. . |
| 3,551,607 | 12/1970 | Tommasi et al. . |
| 4,018,998 | 4/1977 | Wegner . |
| 4,495,652 | 1/1985 | Leslie . |
| 4,712,229 | 12/1987 | Nakamara ........................... 379/58 |
| 4,715,063 | 12/1987 | Haddad et al. ..................... 379/390 |
| 4,845,772 | 7/1989 | Metroka et al. . |

FOREIGN PATENT DOCUMENTS

| | | | |
|---|---|---|---|
| 0445808 | 11/1991 | European Pat. Off. | 455/90 |
| 0061515 | 3/1988 | Japan | 455/89 |

OTHER PUBLICATIONS
Mitsubishi (Pub. date Jan. 1, 1991).

*Primary Examiner*—Reinhard J. Eisenzopf
*Assistant Examiner*—Mark D. Wisler
*Attorney, Agent, or Firm*—Juliana Agon

[57] ABSTRACT

A radio or speaker-microphone unit (10) includes a radio housing (11) and a first (17") or second (17') battery housing. A speaker (33) is disposed in the radio housing (11) and two microphones (34" and 34') are disposed respectively, in the radio housing (11) and in the second battery housing (17'). The battery housings (17' and 17") are selectively attachable with the radio housing (11) to provide a selection between first and second relative positions, with one of the positions providing a handset configuration and the other providing a speaker-microphone configuration. A switch (37) senses which of the battery housings (17', 17") is attached and disables (36) the microphone (34") in the radio housing (11) if the second battery housing (17') is attached.

15 Claims, 3 Drawing Sheets

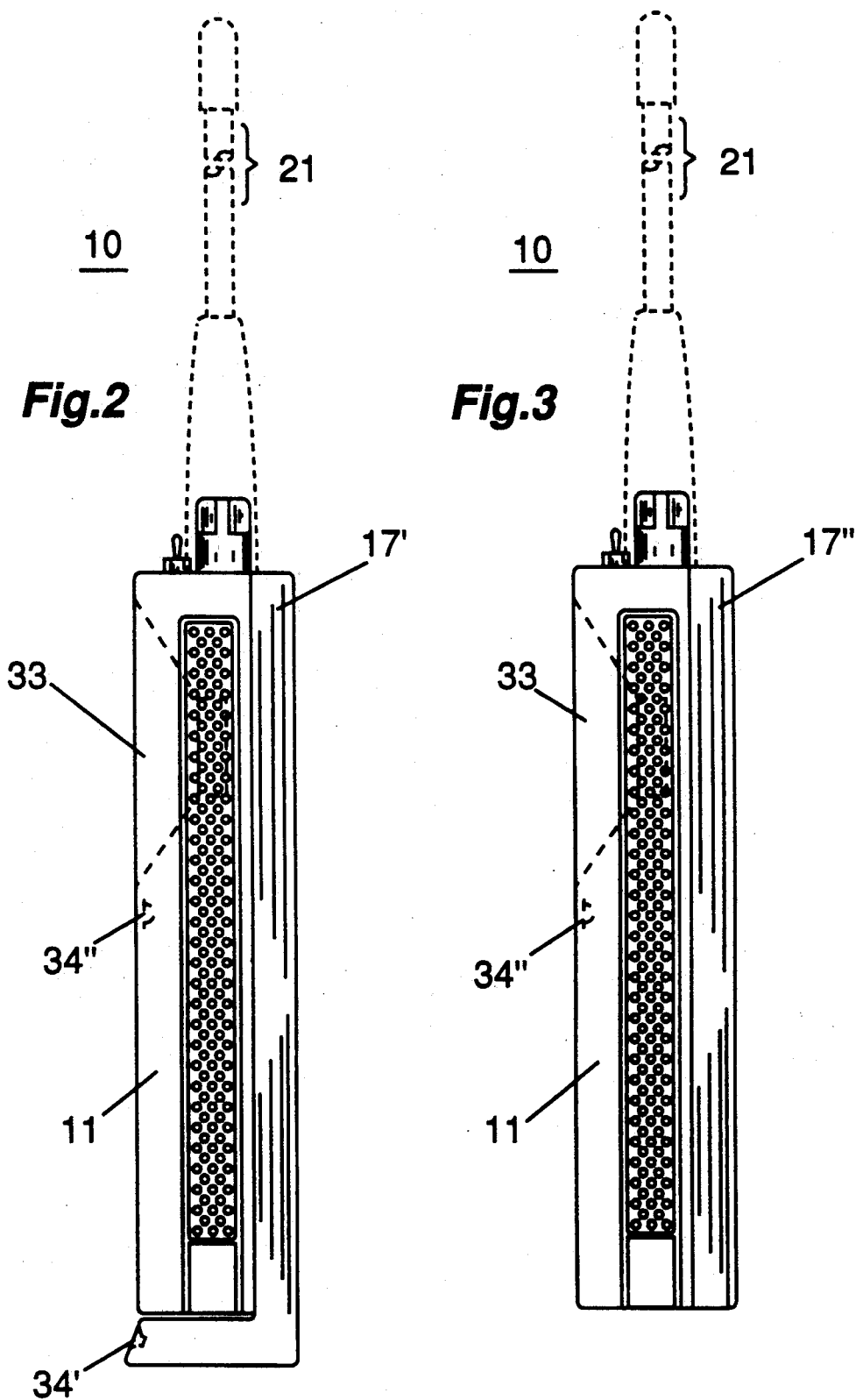

CONVERTIBLE HALF-TO-FULL DUPLEX RADIO OPERATION SELECTED BY BATTERY

TECHNICAL FIELD

This invention relates to communication devices in general and particularly to a communication device, including a speaker, a battery, and a microphone.

BACKGROUND

Various communication devices utilize both a speaker and a microphone. The conventional telephone type "handset", which is used both for wire-line telephone communication and two-way radio communication, includes a housing having a speaker at one end and a microphone at the other. The speaker and microphone are positioned so that the handset can be held with the speaker adjacent to the user's ear and the microphone in proximity to the user's mouth. Such handsets are used for full duplex communication, such as a telephone where audio can be produced at the speaker at the same time the user is articulating sound into the microphone. This is conventional in both land line telephone systems and some two-way radio systems. Such a handset can also be used in what is known as half-duplex radio communication, in which voice signals are alternatively transmitted or received. When used in such a configuration, either a push-to-talk switch (PTT) is provided or else a voice-actuated transmit circuit (VOX) can be utilized. Portable, two-way radio transceivers, such as those used in the land mobile radio service, typically include both a microphone and speaker in the housing. While early two-way radio transceivers had the speaker and the microphone configured to permit their use in a manner similar to a telephone handset, most two-way radio transceivers today have the speaker and microphone in relatively close proximity since these devices are typically half duplex and are not capable of simultaneous transmission and reception of signals. This arrangement will be referred to as the speaker-microphone configuration.

All these known devices are relatively inflexible in that their use is essentially limited to the predetermined configuration either as a telephone-type handset or as a speaker-microphone configuration.

SUMMARY OF THE INVENTION

This communication device is utilizable within different battery configurations. The device includes a radio housing, and a first or second battery housing. The battery housings are selectively attachable with a radio housing, in first and second relative positions. A speaker is disposed in the radio housing while two microphones are disposed, respectively, in the radio housing and in the second battery housing. In one aspect of the invention, the battery housings are slidably interconnected to permit a choice between battery housing attachment to provide the first and second positions. In another aspect of the invention, the communication device includes a contact switch sensor for determining which of the battery housings is attached to the radio housing. In still another aspect of the invention the device includes an amplifier providing audio signals to the speaker. A control means responsive to the sensor controls the gain of the amplifier. In yet, another aspect of the invention, a switch senses which of the battery housings is attached and disables the microphone in the radio housing if the second battery housing (containing another microphone) is attached. Thus, at any time, either the radio housing or the second battery housing has an operating microphone

BRIEF DESCRIPTION OF THE DRAWINGS

FIG. 2 is a right side view of the communication device shown in the handset position.

FIG. 3 is a right side view of the communication device shown in the speaker-microphone position.

DETAILED DESCRIPTION OF THE PREFERRED EMBODIMENT

Figure 1:
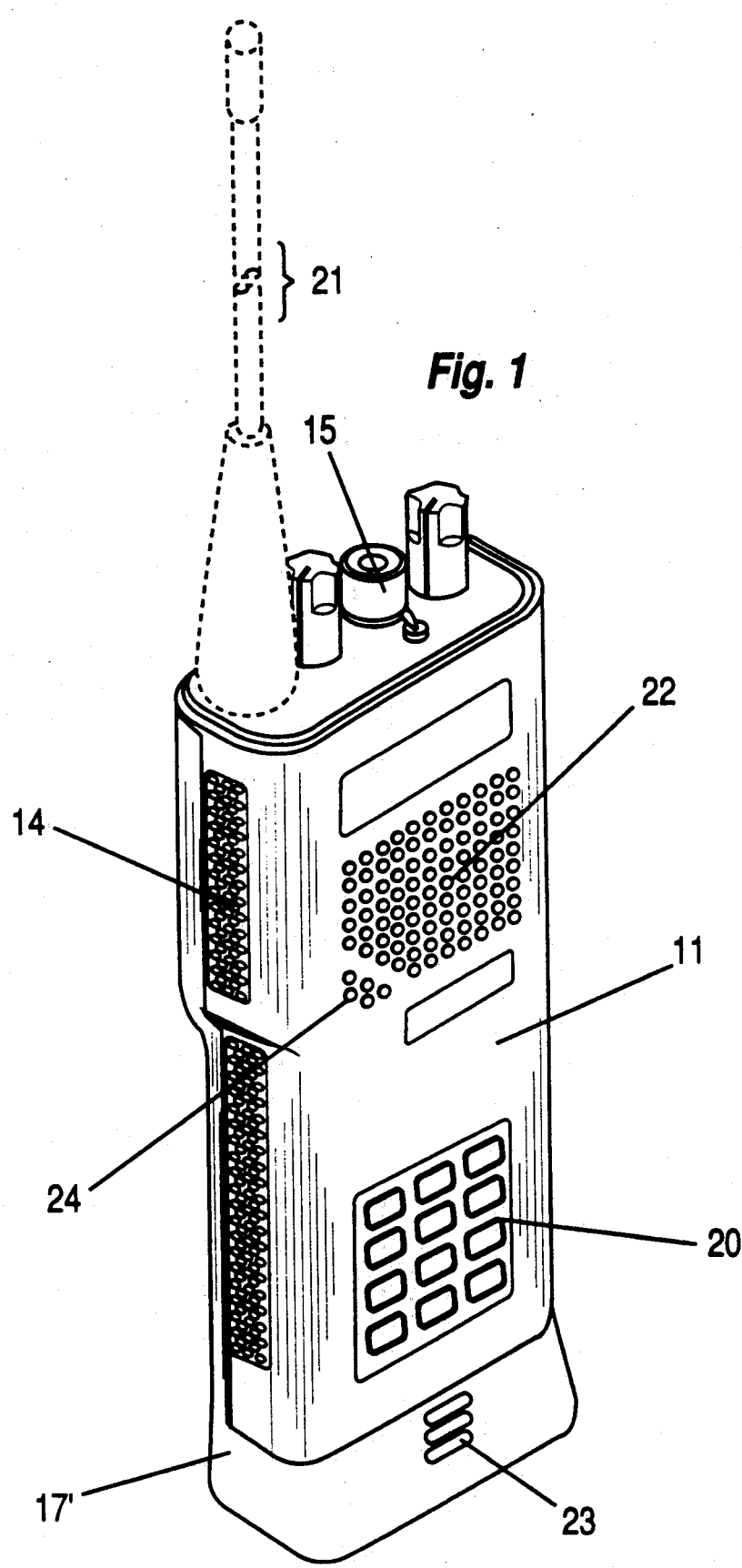
FIG. 1 is front view of a communication device in accordance with the present invention shown in the handset position.

Referring to FIGS. 1-3, a communication device, such as a two-way radio 10, includes a housing portion 11. In this preferred embodiment, the housing portion 11 carries the radio circuitry and includes a push-to-talk switch 14 (shown in FIGS. 2 and 3), a volume up-and-down control 15, and selectively carries either a battery portion 17' or 17''.

The selective battery portion 17' or 17'' is slidably or otherwise connected to the housing portion 11 by any suitable connection means such as a latch. The battery portion 17' is simply a battery which attaches to the same housing portion 11 as can the battery portion 17''. Alternatively, the battery portion 17'' includes a first microphone port 23 communicating with a first microphone 34' disposed on the bottom of the battery portion 17'' which is angled outwardly, preferably at 45° for improved ergonomics.

The radio 10 preferably further includes a keypad 20 and can include an antenna 21 which can be either internal or external to the housing portion 11. A speaker port or grill 22 is also located in the housing portion 11. Below the speaker grill 22 is disposed a second microphone port 24 communicating with a second microphone 34''.

Figure 4:
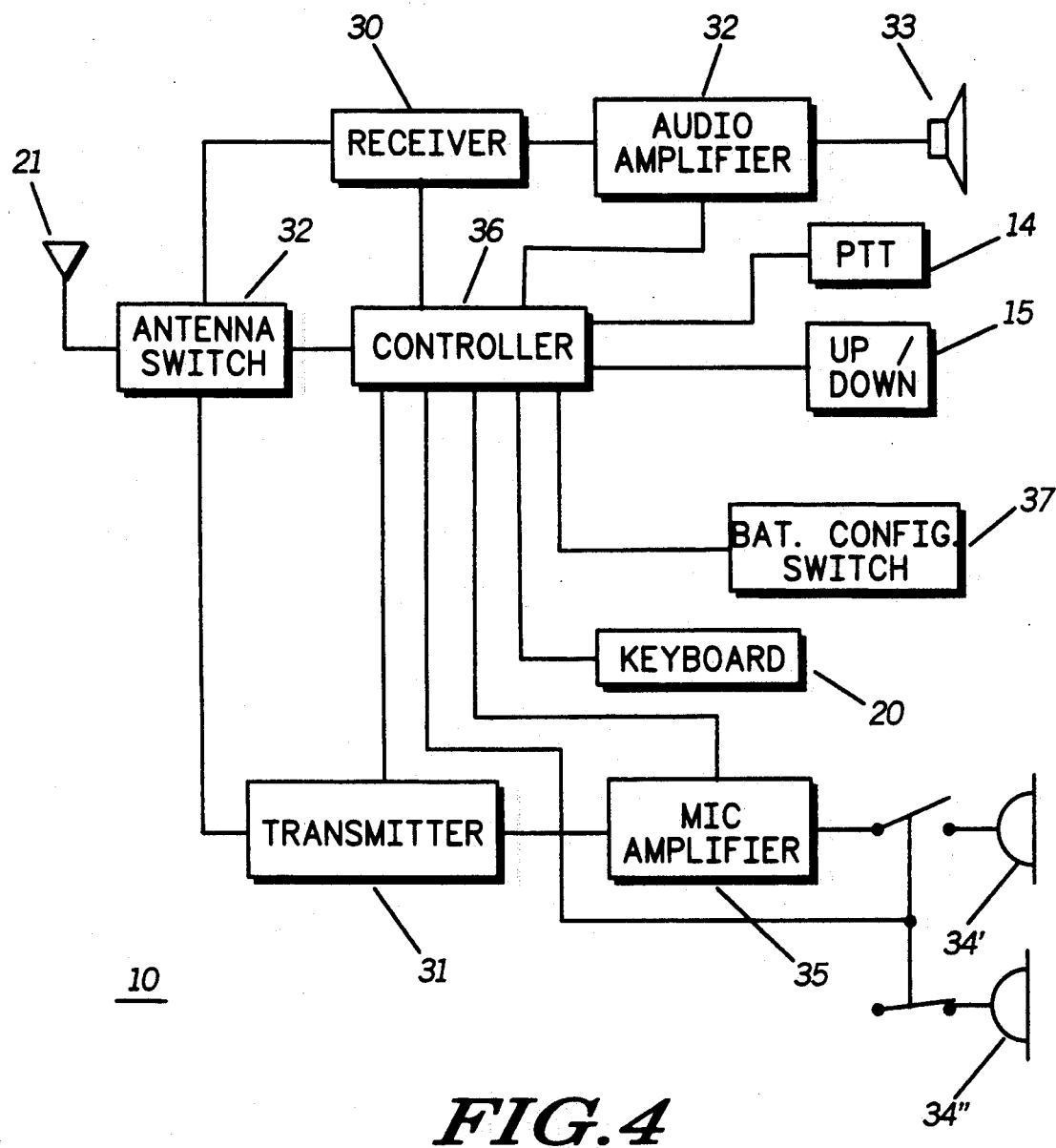
FIG. 4 is an electrical block diagram of the communication device.

The basic electrical block diagram of the radio 10 is illustrated in FIG. 4. As shown, the antenna 21 is coupled to receiver and transmitter portions 30 and 31, respectively, as by an antenna switch 32. Antenna switch 32 can be an electrical switching arrangement, such as those utilizing pin diodes, or can provide the antenna connection function by serving as a circulator or duplexer where frequency division duplex radio transmissions are to occur. Received audio signals are supplied by receiver 30 to an audio amplifier 32 comprising an amplifier means for driving an audio transducer, such as speaker 33. Voice signals to be transmitted by the radio 10 are applied to a microphone means, such as either microphone 34' or 34'' (depending upon which battery housing 17' or 17'' is attached), from which the audio signals are amplified by a microphone amplifier 35 prior to application to the transmitter 31. A control means which can be a microprocessor, such as controller 36, is used to control the operation of the radio 10. The push-to-talk switch 14 and up-and-down control 15 are operatively coupled to the controller 36 as is the keyboard 20. A contact switching mechanism 37 comprising sensor means, which is internal to the radio 10, is used for determining which of the battery portions 17' or 17'' is selectively attached to the common housing portion 11. As one exemplary implementation, the contact switching mechanism 37 can detect the presence of the microphone contained battery housing portion 17' by sensing the existence of an extra contact related to the microphone 34'. This contact switch 37 is coupled to the controller 36 in order to provide automatic control features in the radio 10 relating to which of the battery configuration 17' or 17" is attached. If the microphone-contained battery housing portion 17' is attached as sensed by the contact switch 37, the controller 36 disables the microphone 34" in the radio housing. The gain of audio amplifier 32 and microphone amplifier 35 are both controlled by the controller 36. And, preferably, are setable by using the up-and-down control 15. Where the controller 36 includes internal memory, setting values can be stored within the controller 36. Preferably, the controller 36 stores values for both of the battery configurations 17' and 17". For example, when the common radio housing 11 is attached with the battery portion 17', as illustrated in FIG. 1 and FIG. 2, the gain of audio amplifier 32 and consequently, the volume present at the speaker port 22 is set using the up-and-down knob control 15. When the same radio housing 11 is attached with the battery portion 17", as illustrated in FIG. 3, the gain of audio amplifier 32 is set independently of the gain of the audio amplifier when the radio 10 includes the other battery portion 17'. The controller 36 retains the last setting for the audio amplifier 32 for both battery configurations 17' and 17". Similarly, the gain of the microphone amplifier 35 is also controlled dependent upon which of the battery configurations 17' or 17" is attached. The contact switch 37 indicates to the controller 36 the configuration of the battery portion as to whether the first microphone port 23 is included in the battery portion 17' or not included in the other battery portion 17". The controller 36 sets the gain of the amplifiers 32 and 35 accordingly.

When the common radio housing 11 is attached to the microphone contained battery portion 17', the radio 10 converts to a handset configuration of FIG. 1 and FIG. 2. Typically, in the handset configuration, the speaker port 22 would be in relative close proximity to the user's ear while the microphone port 23 is in relatively close proximity to the user's mouth. In such use, the gain of audio amplifier 32 and microphone amplifier 35 would most likely be set to relatively low values. Alternatively, when the radio 10 is in the speaker-microphone configuration of FIG. 3 where the simpler battery portion 17" is attached, it is quite likely that the speaker port 22 would be some distance from the user's ear. Consequently, the gain of audio amplifier 32 would be set to a relatively higher value in order to provide increased audio output from the speaker 33. If the radio 10 is to be positioned some distance from the user's mouth, the gain of the microphone amplifier 35 would likewise be set to a relatively higher value.

Typically, radio 10 would be used in the FIG. 3 speaker-microphone configuration when operating in a "dispatch" mode as is typical in a half duplex radio communication system. However, when the user desires privacy in communication or when duplex communication is to occur, the microphone contained battery portion 17' would be substituted in for the simpler battery portion 17" to convert to a handset configuration. The contact switch 37 would sense which of the battery portions 17' or 17" is attached and trigger the controller 36 to adjust the gain of audio amplifier 32 and/or audio microphone amplifier 35. Consequently, not only is the radio 10 usable in the two different configurations, but preferably the gain of the amplifiers 32 and 35 are automatically controlled based upon the battery configuration 17' or 17".

While the preferred embodiment of the communication device is the radio 10, it will be understood that the communication device could be a speaker and microphone unit which would typically be connected, as by a cable, to a radio. Additionally, the radio 10 utilizes a single microphone 34 which communicates with both microphone ports 23 and 24. If desired, separate microphone elements could be provided, with the contact switch 37 operatively selecting the microphone based upon the current configuration of the radio based on the battery housing.

As such, the radio 10 is extremely flexible, permitting use in both handset and speaker-microphone configurations. Preferably, the audio level of the speaker 33 and the microphone 34 are controlled accordingly.

What is claimed is:

1. A communication device comprising:
   half and full duplex selectable transceiver means for receiving and transmitting, alternatively, in a half-duplex radio communication operation, or simultaneously, in a full duplex radio communication operation;
   a radio housing for housing said transceiver means, said housing having a speaker and a first microphone;
   a first configured battery housing for selecting said half-duplex operation; and
   a second configured battery housing having a second microphone for selecting said full-duplex operation;
   said first configured battery housing or said second configured battery housing being selectively attached with said radio housing to provide a first attached position or a second attached position, respectively, said second attached position providing a handset configuration for said full-duplex operation and said first attached position providing a speaker-microphone configuration for said half-duplex operation, wherein both handset and speaker-microphone configurations are hand-held mode configurations.

2. A communication device as defined in claim 1, in which:
   said first and second configured battery housings are slidably interconnected with said radio housing to select between said first and second attached positions.

3. A communication device as defined in claim 1, further comprising:
   sensor means for determining which of said battery housings is attached to said radio housing and disables said first microphone in said radio housing if said second battery housing is attached to said radio housing.

4. A communication device as defined in claim 3, in which: said sensor means comprises a switch.

5. A communication device as defined in claim 3, further comprising:
   amplifier means for providing an audio signal to said speaker; and
   control means for controlling said amplifier means; and
   said control means being responsive to said sensor means.

6. A communication device, as defined in claim 1, wherein said second battery housing includes a microphone port communicating with said second microphone.

7. A communication device attachable either with a first external battery including an external microphone or a second external battery without said external microphone, the communication device comprising:

half and full duplex selectible transceiver means for receiving and transmitting, alternatively, in a half-duplex radio communication operation, or simultaneously, in a full duplex radio communication operation;

a speaker;

an internal microphone switchable between operation to accommodate said half-duplex operation and non-operation to accommodate said full-duplex operation depending on whether said first or second external battery is attached;

an amplifier having a controllable gain;

a sensor for detecting whether said external microphone is included in said first external battery or said internal microphone is operating instead; and control means responsive to said sensor for controlling the gain of said amplifier.

8. A communications device, as defined in claim 7, in which said amplifier is operatively connected to said internal microphone.

9. A communication device, as defined in claim 7, in which said amplifier is operatively coupled to said external microphone.

10. A communication device, as defined in claim 7, wherein the communication device comprises a radio.

11. A communication device, as defined in claim 7, wherein the communication device comprises a radio accessory unit having said speaker and said internal microphone.

12. A radio comprising:

half and full duplex selectible transceiver means for receiving and transmitting, alternatively, in a half-duplex radio communication operation, or simultaneously, in a full duplex radio communication operation;

a radio housing for housing said transceiver means, said housing having a speaker, a first microphone port, and a first microphone;

said first microphone port communicating with said first microphone;

a first configured battery housing for selecting said half-duplex operation; and a second configured battery housing saving a second microphone and a second microphone port for selecting said full-duplex operation;

said second microphone port communicating with said second microphone;

said first battery housing or said second battery housing being selectively attached with said radio housing to provide a first attached position or a second attached position, respectively, said second attached position providing a handset configuration for said full-duplex operation and said first attached position providing a speaker-microphone configuration for said half-duplex operation, wherein both handset and speaker-microphone configurations are hand-held mode configurations.

13. A battery housing for switching a normal half-duplex operation of a radio to a full-duplex operation, the radio having half and full duplex selectible transceiver means for receiving and transmitting, alternatively, in the half-duplex radio communication operation, or simultaneously, in the full duplex radio communication operation, the battery housing comprising: a battery enclosed in said battery housing; a microphone enclosed in said battery housing; a microphone port communicating with said microphone; and connecting means for connecting said battery housing to said radio and for switching said normal half-duplex operation of said radio to said full-duplex operation.

14. The battery housing of claim 13 wherein said microphone port is disposed in a bottom portion of said battery housing which is angled outwardly at about 45°.

15. The battery housing of claim 13 wherein said connecting means comprises a latch.

* * * * *